UNITED STATES PATENT OFFICE.

JOHANN BAMMANN, ERNST DAVIDIS, AND WALTER VORSTER, OF ELBERFELD, GERMANY, ASSIGNORS TO THE FARBENFABRIKEN OF ELBERFELD COMPANY, OF NEW YORK, N. Y.

BLUE-RED SUBSTANTIVE DYE.

SPECIFICATION forming part of Letters Patent No. 656,620, dated August 28, 1900.

Application filed April 4, 1900. Serial No. 11,455. (No specimens.)

*To all whom it may concern:*

Be it known that we, JOHANN BAMMANN, ERNST DAVIDIS, and WALTER VORSTER, doctors of philosophy, chemists, (assignors to the FARBENFABRIKEN OF ELBERFELD COMPANY, of New York,) residing at Elberfeld, Germany, have invented a new and useful Improvement in Azo Dyes; and we hereby declare the following to be a clear and exact description of our invention.

In another application bearing the same date we have described a general process for the production of azo-dyestuffs, which process consists in combining two molecules of either the same or different diazo compounds with one molecule of the dioxydinapthylamin disulfonic acid having the following formula:

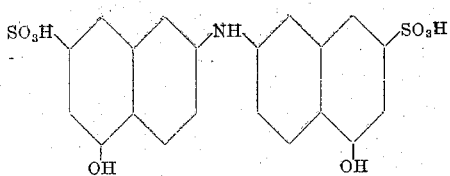

On using in this process two molecules of diazotized meta-xylidin (which base has the formula:

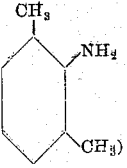

a new azo dyestuff can be prepared, which is distinguished by the property of dyeing unmordanted cotton valuable bluish-red fast shades. In order to produce this dyestuff, we can proceed as follows, the parts being by weight: 24.2 parts of meta-xylidin are diazotized in the usual way by means of 5.6 parts of hydrochloric acid of 19° Baumé and fourteen parts of sodium nitrite. The solution of the diazo compound thus obtained is stirred while cooling into a concentrated solution of 46.1 parts of dioxydinaphthylamin disulfonic acid (having the above-given formula) which is mixed with twelve parts of sodium carbonate. The reaction mass must remain alkaline throughout the whole reaction. Stirring is continued for about twelve hours until the reaction is finished. The mixture is then heated to about 80° centigrade and the dyestuff thus produced is precipitated by means of common salt, fitered off, pressed, dried, and pulverized.

The new coloring-matter represents a brown powder of a metallic luster, soluble in water, with a bluish-red color. It is the sodium salt of an acid having the following formula:

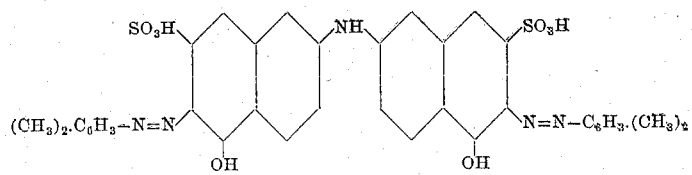

By concentrated sulfuric acid of 60° Baumé it is dissolved, yielding a blue solution, the color of which changes into reddish-violet on the addition of a small quantity of ice, while a dark precipitate is separated therefrom on adding a larger quantity of ice. It is also soluble in ammonia, as well as in alcohol, with a red color.

The new dyestuff yields on unmordanted cotton in alkaline baths clear bluish-red fast shades.

Having now described our invention and in what manner the same is to be performed, what we claim as new, and desire to secure by Letters Patent, is—

As a new article of manufacture the dyestuff being an alkaline salt of an acid having the formula:

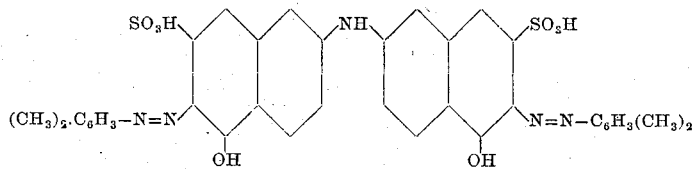

which is a brown powder of a metallic luster, soluble in water with a bluish-red color, soluble in concentrated sulfuric acid with a blue color which turns into reddish-violet on adding a small quantity of ice, while a dark precipitate is obtained on the addition of a larger quantity of ice to the sulfuric-acid solution, soluble in alcohol as well as in ammonia with a red color, dyeing unmordanted cotton in alkaline baths clear bluish-red fast shades, substantially as hereinbefore described.

In testimony whereof we have signed our names in the presence of two subscribing witnesses.

JOHANN BAMMANN.
ERNST DAVIDIS.
WALTER VORSTER.

Witnesses:
OTTO KÖNIG,
J. A. RITTERSHAUS.